(12) United States Patent
Gershfang et al.

(10) Patent No.: US 8,762,427 B2
(45) Date of Patent: Jun. 24, 2014

(54) SETTLEMENT HOUSE DATA MANAGEMENT SYSTEM

(75) Inventors: Igor Y. Gershfang, Chicago, IL (US); Erin Marie Karam, West Lake Hills, TX (US); John Martin Patterson, Toronto (CA); William James Rampton, Naperville, IL (US); Kevin Niles Reed, Arlington Heights, IL (US); William Phillip Shaouy, Atlanta, GA (US); Kurt James Solarte, Kirribilli (AT)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 12/984,058

(22) Filed: Jan. 4, 2011

(65) Prior Publication Data
US 2012/0173591 A1     Jul. 5, 2012

(51) Int. Cl.
*G06F 17/30*     (2006.01)

(52) U.S. Cl.
USPC .......................................... 707/810; 705/7.38

(58) Field of Classification Search
USPC ......... 707/600, 602, 603, 607, 796, 802, 803, 707/804, 807, 809, 810, 618, 619, 620, 628, 707/806, 811, 825; 705/7.29, 7.32, 7.38
See application file for complete search history.

(56) References Cited

U.S. PATENT DOCUMENTS

| | | | |
|---|---|---|---|
| 6,735,604 B2 | 5/2004 | Miller et al. | |
| 7,143,100 B2 | 11/2006 | Carlson et al. | |
| 7,707,487 B2 | 4/2010 | Easter et al. | |
| 7,873,666 B2* | 1/2011 | Sauermann | 707/793 |
| 7,917,376 B2* | 3/2011 | Bellin et al. | 705/2 |
| 2003/0220804 A1 | 11/2003 | Wilson, Jr. et al. | |
| 2005/0137903 A1* | 6/2005 | Storms et al. | 705/1 |
| 2007/0073661 A1 | 3/2007 | McVeigh et al. | |
| 2008/0154642 A1 | 6/2008 | Marble et al. | |
| 2009/0276270 A1* | 11/2009 | Karnataka | 705/8 |
| 2010/0174558 A1 | 7/2010 | Smith et al. | |
| 2011/0246501 A1* | 10/2011 | McMenamin et al. | 707/769 |

OTHER PUBLICATIONS

Henderson et al., "SAR Applications in Human Settlement Detection, Population Estimation and Urban Land Use pattern Analysis: A Status Report", IEEE Transactions on Geoscience and Remote Sensing, vol. 35, No. 1, Jan. 1997, pp. 1-7.
Hopkins et al., "Representing urban development plans and regulations as data: a planning data model", Environment and Planning B: Planning and Design, vol. 32, No. 4, 2005, pp. 597-615.

* cited by examiner

*Primary Examiner* — Greta Robinson
(74) *Attorney, Agent, or Firm* — Matthew H. Chung; Yee & Associates, PC

(57) ABSTRACT

A method, social services data management system, and computer program product for managing data about social services. In response to receiving the data about the social services provided to a group of clients at a data collection application running on a computer system, the data collection application running on the computer system places the data into a first database in a first format using a content model identifying entities for the social services and relationships between the entities. The computer system changes the data in the first database from the first format to a second format used by a second database. The computer system moves the data in the second format to the second database. A report application running on the computer system generates a number of reports using the data in the second format in the second database.

20 Claims, 10 Drawing Sheets

SETTLEMENT HOUSE DATA MANAGEMENT SYSTEM

BACKGROUND

1. Field

The present disclosure relates generally to an approved data processing system and, in particular, to a method and apparatus for processing data. Still more particularly, the present disclosure relates to a method and apparatus for managing data relating to urban services.

2. Description of the Related Art

Social services are services directed towards social welfare and social change. Social services are often performed to promote and/or increase the well-being of individuals. Typically, social services have a goal of improving the financial situation of people who may be in need.

Many different organizations provide social services. For example, a settlement house is an organization that provides services to the economically disadvantaged. In particular, settlement houses have provided services to the economically disadvantaged in urban areas. These settlement houses have often provided food, shelter, education, and other services to the economically disadvantaged in different urban areas.

Settlement houses collect information about the users of its services. These users are often referred to as clients. This information is used for purposes, such as identifying usage of services, quality of services provided, budgeting, and other suitable purposes.

The information about clients is typically collected using paper forms. These forms are then aggregated and analyzed. Through the analysis of this information, the programs provided by settlement houses may be evaluated. This evaluation may be used to identify improvements, needs for existing programs, new programs, budget changes, and other types of changes. Further, the performance of one settlement house in one location also may be compared to the performance of settlement houses in other locations through the use of the information collected and analyzed. In this manner, changes may be made to better provide social services to the urban economically disadvantaged by settlement houses.

SUMMARY

The different illustrative embodiments provide a method, a social services data management system, and a computer program product for managing data about social services. In response to receiving the data about the social services provided to a group of clients at a data collection application running on a computer system, the data collection application running on the computer system places the data into a first database in a first format using a content model identifying entities for the social services and relationships between the entities. The computer system changes the data in the first database from the first format to a second format used by a second database. The computer system moves the data in the second format to the second database. A report application running on the computer system generates a number of reports using the data in the second format in the second database.

DETAILED DESCRIPTION

Figure 1:
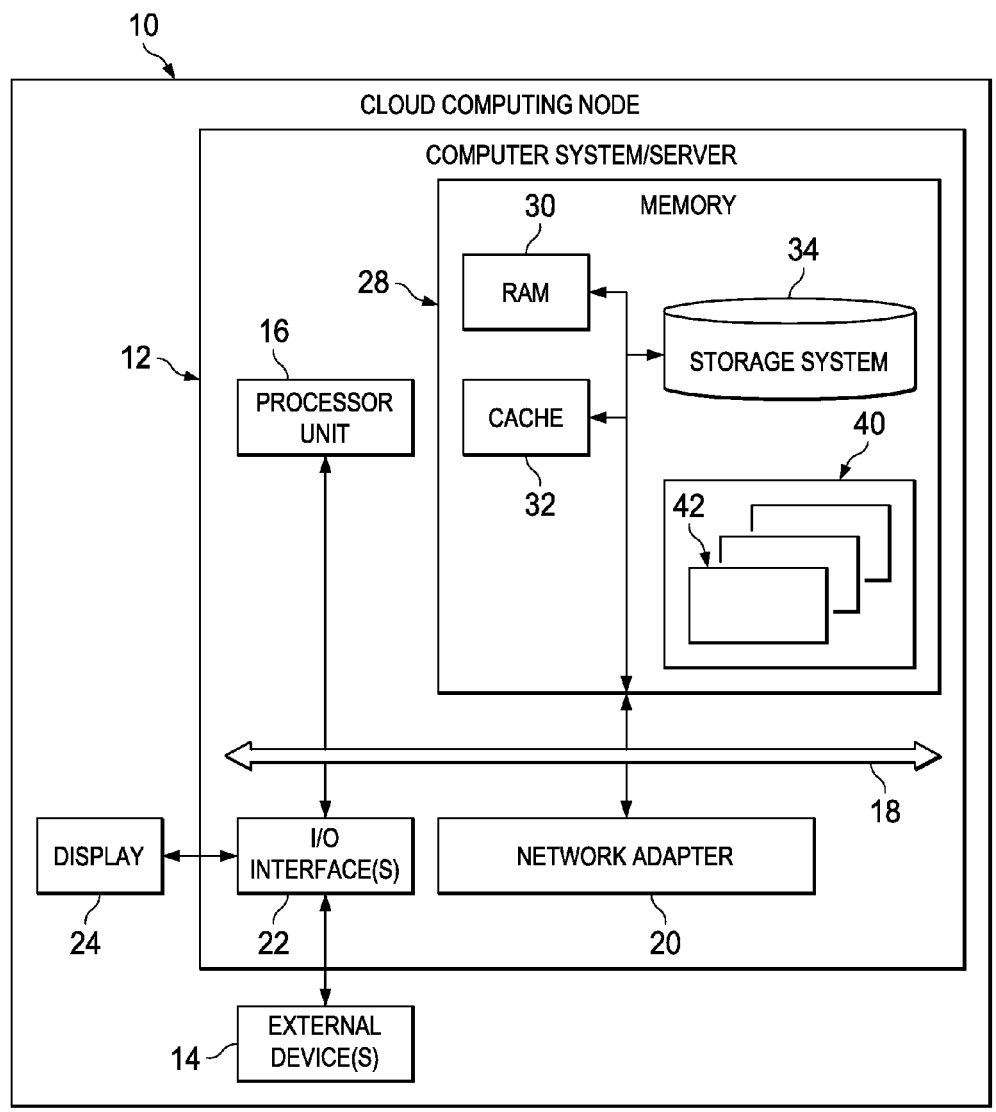
FIG. 1 is a cloud computing node in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, or other physical or tangible device. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device. These types of devices may also be referred to as computer readable tangible storage devices.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to, wireless, wireline, optical fiber cable, radio frequencies, etc.

Computer program code for carrying out operations of the present invention may be written in any combination of one or more programming languages, including an object-oriented programming language, such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN); or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions, which execute on the computer or other programmable apparatus, provide processes for implementing the functions/acts specified in the flowchart and/or block diagram block or blocks.

It is understood in advance that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions, which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processors, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, automatically as needed without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources, dynamically assigned and reassigned according to demand. There is a sense of location independence in that the consumer generally has no control or knowledge over the exact location of the provided resources, but may be able to specify location at a higher level of abstraction (e.g., country, state, or data center).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource usage by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications, and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a cloud computing node is depicted in accordance with an illustrative embodiment. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10, there is computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. As yet another example, the components in computer system/server 12 may be used to implement any data processing system. For example, the components in computer system/server 12 may be used to implement a data processing system, such as a mobile phone.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processor unit 16, memory 28, and bus 18 that couples various system components, including memory 28, to processor unit 16.

Processor unit 16 executes instructions for software that may be loaded into memory 28. Processor unit 16 may be a number of processors, a multi-processor core, or some other type of processor, depending on the particular implementation. A number, as used herein with reference to an item, means one or more items. Further, processor unit 16 may be implemented using a number of heterogeneous processor systems in which a main processor is present with secondary processors on a single chip. As another illustrative example, processor unit 16 may be a symmetric multi-processor system containing multiple processors of the same type.

Bus 18 represents one or more of any of several types of bus structures, including a memory bus or memory controller, a peripheral bus, an accelerated graphics port, a processor, or a local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

Computer system/server 12 typically includes a variety of computer system readable media. Such media may be any available media that is accessible by computer system/server 12 and includes both volatile and non-volatile media and removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from, and writing to, a non-removable, non-volatile magnetic media (not shown and typically called a "hard drive"). Although not shown, a magnetic disk drive for reading from, and writing to, a removable, non-volatile magnetic disk (e.g., a "floppy disk"), and an optical disk drive for reading from, or writing to, a removable, non-volatile optical disk, such as a CD-ROM, DVD-ROM, or other optical media, can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data, or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, display 24, one or more devices that enable a user to interact with computer system/server 12, and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples include, but are not limited to, microcode, device drivers, redundant processing units, external disk drive arrays, RAID systems, tape drives, data archival storage systems, etc.

Figure 2:
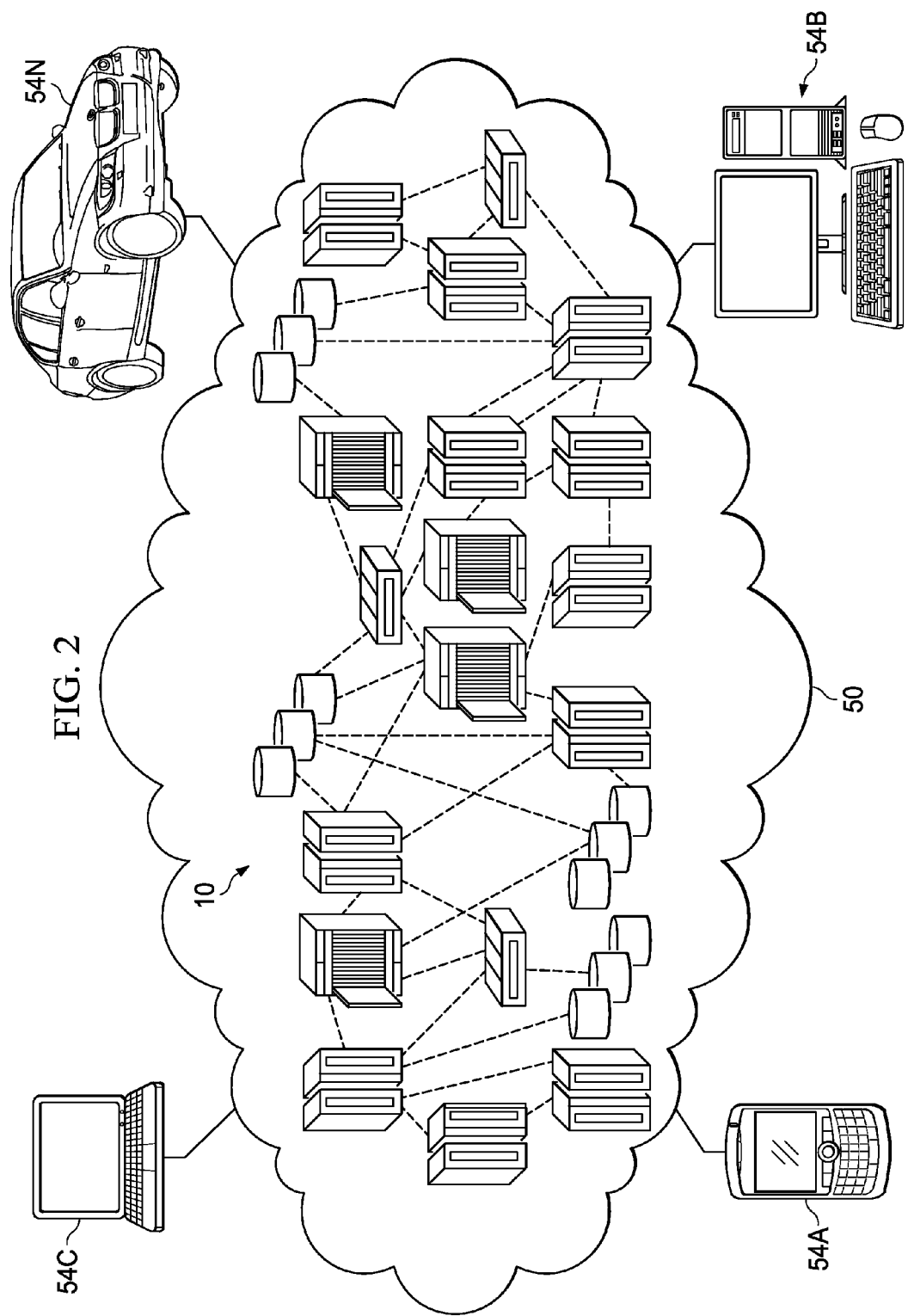
FIG. 2 is an illustration of a cloud computing environment in accordance with an illustrative embodiment.

Referring now to FIG. 2, an illustration of a cloud computing environment is depicted in accordance with an illustrative embodiment. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds, as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that nodes 10 and cloud computing environment 50 can communicate with any type of computerized device over any type of network and/or network addressable connection (e.g., using a web browser). Program code located on one of nodes 10 may be stored on a computer recordable storage medium in one of nodes 10 and downloaded to a computing device within computing devices MA-N over a network for use in these computing devices. For example, a server computer in computing nodes 10 may store program code on a computer readable storage medium on the server computer. The server computer may download the program code to a client computer in computing devices 54A-N for use on the client computer.

Figure 3:
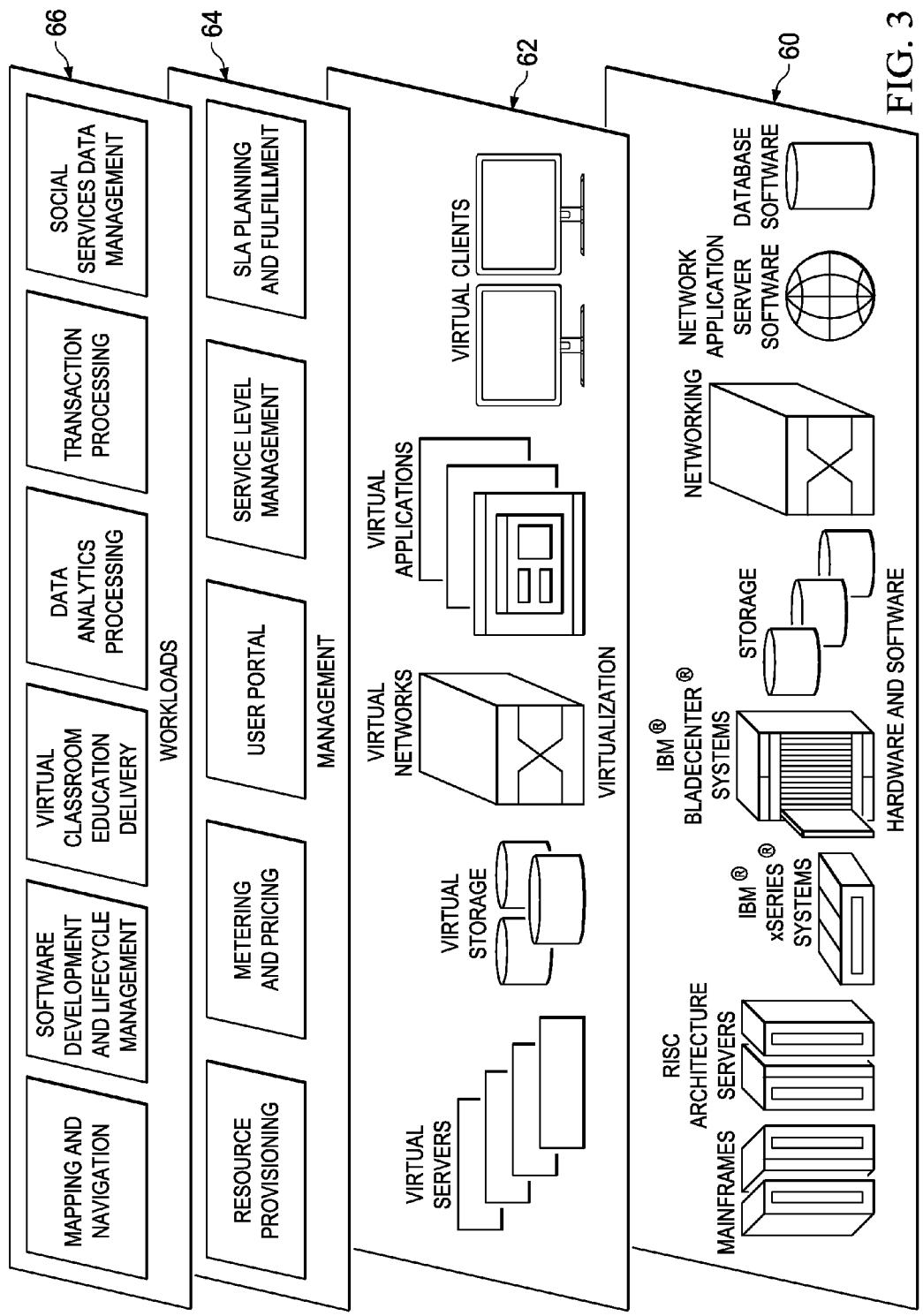
FIG. 3 is an illustration of abstraction model layers in accordance with an illustrative embodiment.

Referring now to FIG. 3, an illustration of abstraction model layers is depicted in accordance with an illustrative embodiment. In this example, a set of functional abstraction layers, provided by cloud computing environment 50 in FIG. 2, is shown. It should be understood in advance that the components, layers, and functions shown in FIG. 3 are intended to be illustrative only, and embodiments of the invention are not limited thereto. As depicted, the following layers and corresponding functions are provided:

Hardware and software layer 60 includes hardware and software components. Examples of hardware components include mainframes. Examples include IBM® zSeries® systems, RISC (Reduced Instruction Set Computer) architecture-based servers, IBM pSeries® systems, IBM xSeries® systems, IBM BladeCenter® systems, storage devices, networks, and networking components. Examples of software components include network application server software, such as, for example, IBM WebSphere® application server software, and database software, such as, for example, IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. The user portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation, software development and lifecycle management, virtual classroom education delivery, data analytics processing, transaction processing, and social services data management. Social services data management in workloads 66 may be used to manage information about social services provided to various clients. In these illustrative examples, social services data management in workloads 66 may be used to manage data collected by settlement houses providing social services to the economically disadvantaged in urban areas.

The different illustrative embodiments recognize and take into account a number of different considerations. For example, the different illustrative embodiments recognize and take into account that the collection of data by personnel, entering the data into the forms, and the aggregation of the data is time consuming. Further, the different illustrative embodiments also recognize that these processes are labor intensive, tedious, and can be error prone. As a result, the different illustrative embodiments recognize and take into account that the assessments made using the aggregated data may have various degrees of error. As a result, the different illustrative embodiments recognize and take into account that the confidence and the accuracy of the data may be lower than desired for purposes of assessing programs in making decisions.

Therefore, the different illustrative embodiments recognize and take into account that it would be advantageous to provide an improved process for managing data used in providing services to the economically disadvantaged in urban areas.

The different illustrative embodiments provide a method and apparatus for managing data about social services. In the different illustrative embodiments, data may be received about social services provided to a group of clients at a data collection application running on a computer system. In response to receiving this data, the data collection application places the data in a first database using a first format using a content model. The content model identifies entities for social services and relationships between the entities. The data in the first database may be changed from the first format to a second format used by the second database. The data in the second format may then be moved to the second database. Thereafter, a report application running on the computer system may generate a number of reports using the data in the second format in the second database.

In this manner, this type of analysis provides a mechanism that is more efficient and accurate, as compared to the use of paper forms and the analysis of those forms. With one or more of the different illustrative embodiments, the analysis performed on social services provided by organizations may be more accurately characterized. In addition, with the different illustrative embodiments, comparisons may be made between different organizations, such as different settlement houses.

Figure 4:
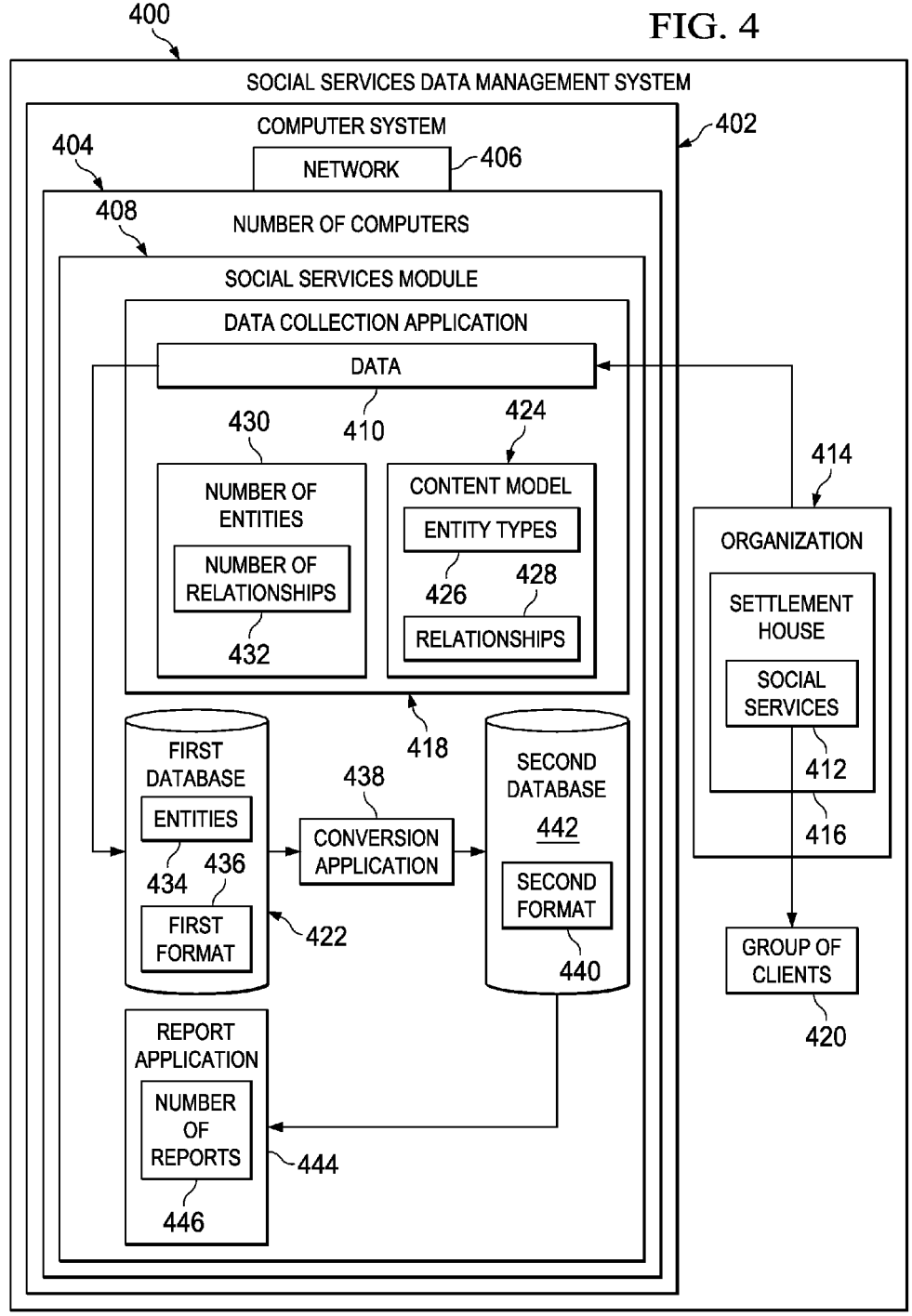
FIG. 4 is an illustration of a social services data management system in accordance with an illustrative embodiment.

With reference now to FIG. 4, an illustration of a social services data management system is depicted in accordance with an illustrative embodiment. In this illustrative example, social services data management system 400 is an example of a system that may be implemented in cloud computing environment 50 in FIG. 2. For example, social services data management system 400 may be implemented in providing functionality, such as social services data management in workload 66 in FIG. 3 for cloud computing environment 50 in FIG. 2.

In this illustrative example, social services data management system 400 includes computer system 402. Computer system 402 comprises number of computers 404. A number, as used herein, refers to one or more items. For example, number of computers 404 is one or more computers. In these illustrative examples, number of computers 404 may be in communication with each other using network 406. In addition, computer system 402 also may include other devices other than computers. For example, without limitation, computer system 402 also may include mobile phones, personal digital assistants, and/or other devices that may include processor units configured to process data.

In this illustrative example, social services module 408 is located in computer system 402. Social services module 408 may be implemented using one or more of number of computers 404. Social services module 408 may be implemented using software, hardware, or a combination of the two.

In this example, social services module 408 receives data 410 about social services 412. In these depicted examples, social services 412 are any services provided to improve at least one of life and living conditions for people. In particular, social services 412 are services provided to those who are economically disadvantaged. Social services 412 may include, for example, without limitation, education, food subsidies, health care, housing, food, and/or other suitable types of services.

Social services 412 are performed by organization 414 in these examples. In particular, organization 414 is settlement house 416. In the illustrative examples, social services module 408 in computer system 402 is used to analyze social services 412 provided by settlement house 416 using data 410.

As depicted, social services module 408 may have a number of different components. For example, data collection application 418 in social services module 408 may receive data 410 for social services 412 provided to group of clients 420. Group of clients 420 are people who receive social services 412 from settlement house 416 in these depicted examples.

In this particular example, data 410 is placed into first database 422 using content model 424. Content model 424 identifies entity types 426 and relationships 428 between entity types 426 in these examples. Data collection application 418 in social services module 408 may create number of entities 430 using data 410.

Additionally, data collection application 418 also identifies number of relationships 432 for number of entities 430. Number of relationships 432 may be relationships between entity types 426 and number of entities 430, relationships between number of entities 430 and entities 434 already in first database 422, or a combination of the two. Data collection application 418 then stores number of entities 430 and number of relationships 432 in first database 422 using first format 436.

In this manner, data 410 is stored in first database 422 in first format 436. Data 410 in first database 422 also may be processed for analysis. For example, conversion application 438 in social services module 408 may change data 410 in first database 422 from first format 436 into second format 440 for second database 442. Second format 440 for second database 442 is a format that is used by second database 442 in these examples. In some illustrative examples, changing data 410 from first format 436 to second format 440 may include selecting a portion of data 410 for the change to second format 440.

Thereafter, conversion application 438 moves data 410 in second format 440 to second database 442. Report application 444 in social services module 408 may then generate number of reports 446 using data 410 in second format 440 in second database 442. Second format 440 is configured such that number of reports 446 may be generated in a desired manner and more easily, as compared to first format 436. For example, second format 440 for data 410 is configured to store aggregated data for a given point in time based on data 410 in first format 436. This aggregated data is stored in second database 442 such that trend analysis may be performed on data 410 in second format 440 over time.

With one or more of the different illustrative embodiments, data 410 for social services 412 performed for group of clients 420 of settlement house 416 may be more easily collected and processed for analysis. Social services module 408 provides a mechanism to more uniformly input and process data. In this manner, errors and increased confidence in the analysis of data may occur.

The illustration of social services data management system 400 in FIG. 4 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, social services module 408 may be used to collect and process data for more organizations in addition to settlement house 416. For example, data 410 may be received for other settlement houses in addition to settlement house 416 and/or other types of organizations that provide social services 412.

Further, in some illustrative examples, social services module 408 may be distributed between different computers in number of computers 404. For example, without limitation, data collection application 418 may be located on one computer in number of computers 404 in computer system 402 while report application 444 may be located on a different computer in number of computers 404 in computer system 402.

Figure 5:
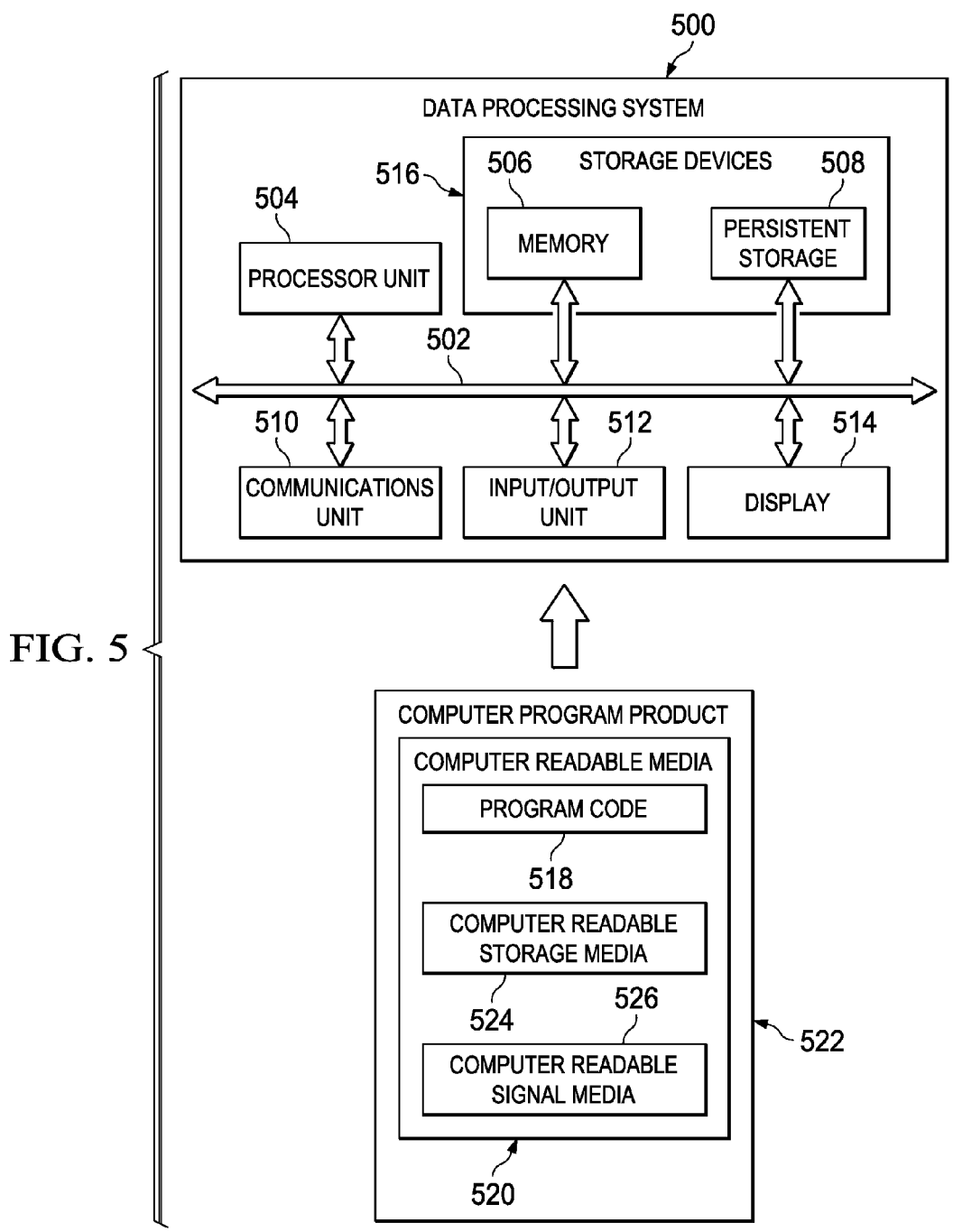
FIG. 5 is an illustration of a data processing system in accordance with an illustrative embodiment.

Turning now to FIG. 5, an illustration of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514. Data processing system 500 in FIG. 5 is an example of a data processing system that may be used to implement computer system 402 in FIG. 4. In particular, data processing system 500 may be used to implement one or more of number of computers 404 in FIG. 4.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these examples, computer readable storage media 524 is a physical or tangible storage device used to store program code 518, rather than a medium that propagates or transmits program code 518. Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices to transmit data, receive data, or transmit and receive data. A communications unit may be, for example, a modem or a network adapter, two network adapters, or some combination thereof. Further, a memory may be, for example, memory 506, or a cache, such as found in an interface and memory controller hub that may be present in communications fabric 502.

Figure 6:
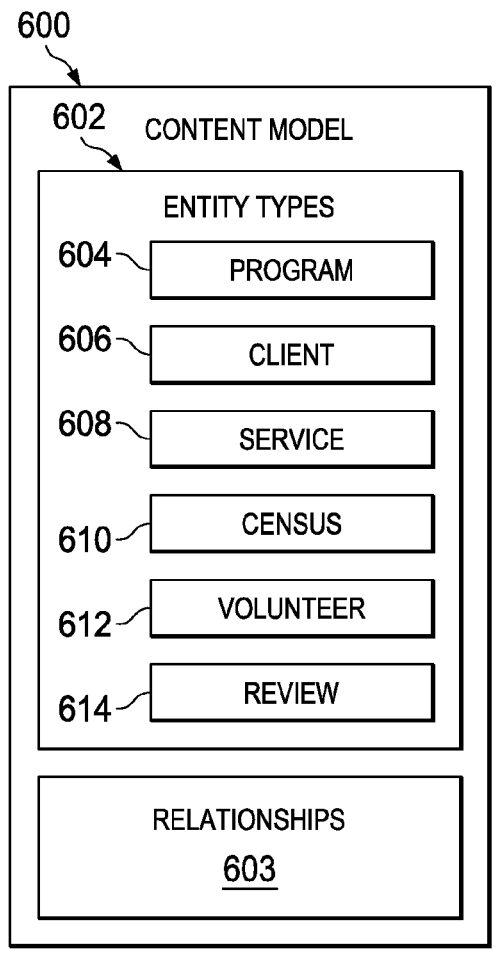
FIG. 6 is a content model in accordance with an illustrative embodiment.

With reference now to FIG. 6, a content model is depicted in accordance with an illustrative embodiment. In this example, content model 600 is an example of one implementation for content model 424 in FIG. 4. As depicted, content model 600 includes entity types 602 and relationships 603. Entity types 602 include, for example, program 604, client 606, service 608, census 610, volunteer 612, and review 614.

In this illustrative example, program 604 is an entity type for programs in an organization, such as organization 414 in FIG. 4, that provides social services. A program run by a settlement house may be, for example, without limitation, an adult literacy program. Program 604 may comprise, for example, without limitation, a start date for a client enrolled in a program, an end date for the client enrolled in the program, a name for the client, and/or other data.

Client 606 is an entity type for clients to whom social services are provided. A client may be, for example, without limitation, an adult person who is illiterate and in need of a program, such as an adult literacy program. Client 606 may comprise, for example, without limitation, a last name, a first name, a birthdate, a gender, an ethnicity, a zip code, an education level, a marital status, and/or other suitable information for the client.

Service 608 is an entity type for a service that may be provided to a group of clients by an organization. The service may be one of many services provided by a program run by the organization. For example, a service provided by an adult literacy program may be a book lending service, a home book distribution service, a public library visit service, and/or other suitable types of services. Service 608 may comprise, for example, without limitation, a service number, a description of the service, a number of hours during which the service has been used by a client, and/or other suitable information.

In this depicted example, census 610 is an entity type for census statistics for an organization, a program, and/or a service. Census statistics include statistics for the clients served by the organization. For example, census 610 may comprise a number of client arrivals, a number of client departures, a number of clients approved for enrollment in the organization, a number of clients that have withdrawn from a program, and/or other types of statistical information.

Volunteer 612 is an entity type for volunteers for an organization. Volunteer 612 comprises statistical information about the volunteers who volunteer at an organization. For example, volunteer 612 may comprise volunteer comments, a start of a volunteer program, a number of volunteers at the start of a month, a number of volunteers at the end of a month, and/or other suitable information.

In this illustrative example, review 614 is an entity type for a review process for evaluating how close an organization is to reaching a number of goals and/or evaluating the financial status of the organization and/or programs in the organization. Review 614 comprises, for example, without limitation, a cost per client, a year, a number of funding resources, a net income, income growth, program performance ratings, and/or other suitable information.

Content model 600 also identifies relationships 603 between entity types 602. Relationships 603, in these illustrative examples, are many-to-one relationships. A many-to-one relationship is where one entity type contains values that refer to another entity type that has unique values. An example of one relationship in relationships 603 is the relationship between program 604 and client 606. In this illustrative example, one or more of program 604 may be related to one of client 606. In other words, one client may be involved in one or more programs.

The illustration of content model 600 is not meant to imply physical or architectural limitations to the manner in which different illustrative embodiments may be implemented. Other types of content models may include or replace entity types 602 with other entity types. For example, another entity type may include donations and/or employees. Donations may be sources of funds for providing services. Employees may be individuals who assist in a program for compensation.

Figure 7:
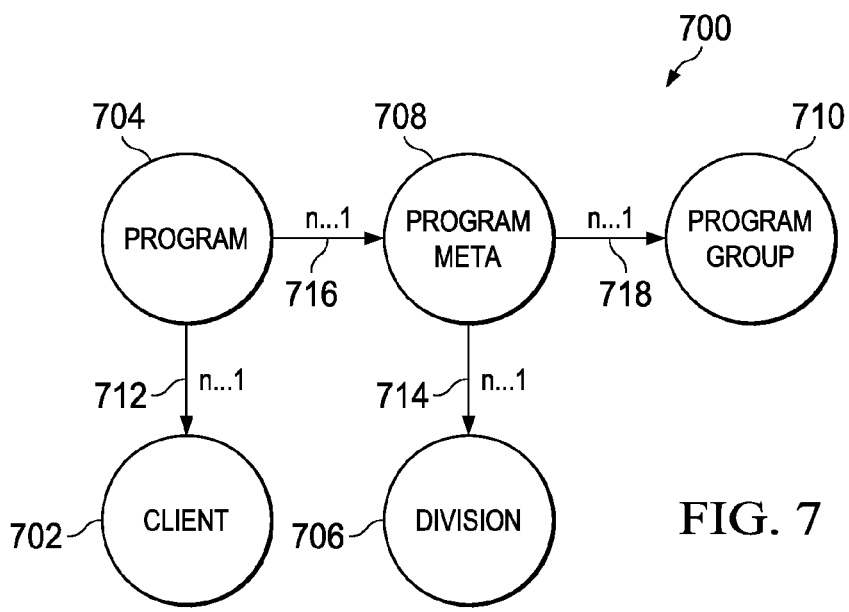
FIG. 7 is an illustration of relationships between entity types in a content model in accordance with an illustrative embodiment.

With reference now to FIG. 7, an illustration of relationships between entity types in a content model is depicted in accordance with an illustrative embodiment. In this illustrative example, relationships 700 are an example of one implementation for relationships 428 in FIG. 4 and/or relationships 603 in FIG. 6. In this depicted example, relationships 700 are many-to-one relationships. Relationships 700 are identified between client 702, program 704, division 706, program meta 708, and program group 710.

Client 702 is an entity type for a client. Program 704 is an entity type for a program in which a client is enrolled. Division 706 is an entity type for a division for a number of programs. A division may be, for example, a department in an organization that runs a number of programs. Program meta 708 is an entity type for meta data for a program. The meta data is data that may be universal for a number of programs. Program group 710 is an entity type for a program group for a client. A program group for a client includes the number of programs in which a client is enrolled.

In this illustrative example, each of these entity types represents a template for storing data for the particular entity type. For example, program 704 represents a template for storing data in a database about a particular program in which a client is enrolled. Each time the template for program 704 is used, a node is created. In other words, each instance in which the template for program 704 is used forms a node.

In this depicted example, program 704 and client 702 have relationship 712. Relationship 712 indicates that one or more of program 704 may be related to client 702. In other words, one or more nodes for program 704 may be related to the same node for client 702. Further, program 704 and program meta 708 have relationship 716. Relationship 716 indicates that one or more of program 704 may use the same program meta 708. Similarly, program meta 708 and division 706 have relationship 714. Relationship 714 indicates that one or more of program meta 708 may be used for the same division 706.

Program meta 708 and program group 710 have relationship 718. Relationship 718 indicates that one or more of program meta 708 may be related to the same program group 710. In other words, a program group for a particular client may be related to one or more program metas for different programs in the program group.

Figure 8:
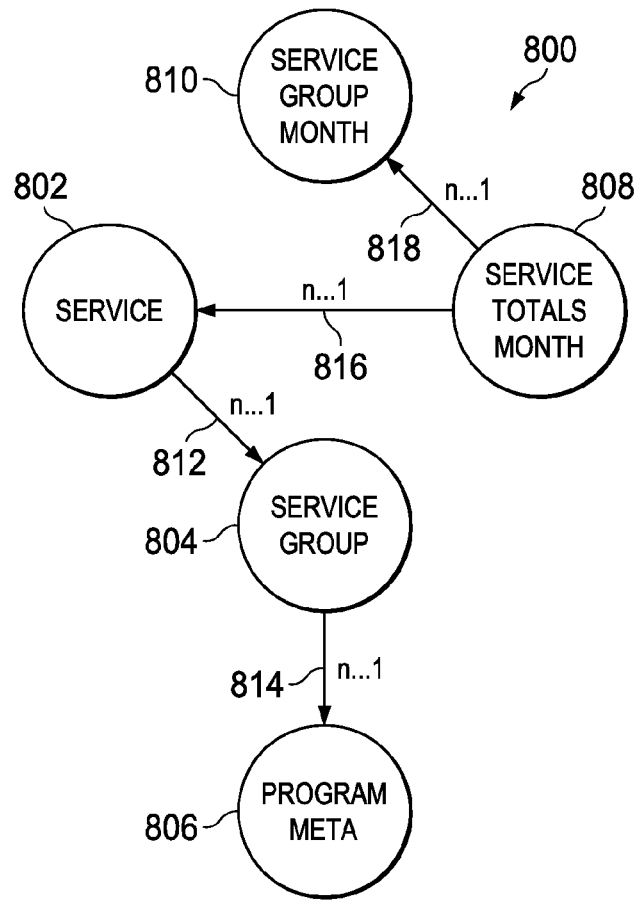
FIG. 8 is an illustration of relationships between entity types in a content model in accordance with an illustrative embodiment.

With reference now to FIG. 8, an illustration of relationships between entity types in a content model is depicted in accordance with an illustrative embodiment. In this illustrative example, relationships 800 are an example of one implementation for relationships 428 in FIG. 4 and/or relationships 603 in FIG. 6. In this depicted example, relationships 800 are many-to-one relationships. Relationships 800 are identified between service 802, service group 804, program meta 806, service totals month 808, and service group month 810.

Service 802 is an entity type for a particular social service that is provided to a client. Service group 804 is an entity type for the set of services provided to a particular client. Program meta 806 is an entity type for the meta data for a program through which the different services in a service group for a client are run. Service totals month 808 is an entity type for statistical information for a particular service for a particular month. Service group month 810 is an entity type for statistical information for a service group for a particular client for a particular month.

As depicted, service 802 and service group 804 have relationship 812. Service group 804 and program meta 806 have relationship 814. Service totals month 808 and service 802 have relationship 816. Service totals month 808 and service group month 810 have relationship 818. Relationships 812, 814, 816, and 818 are many-to-one relationships in this illustrative example.

Figure 9:
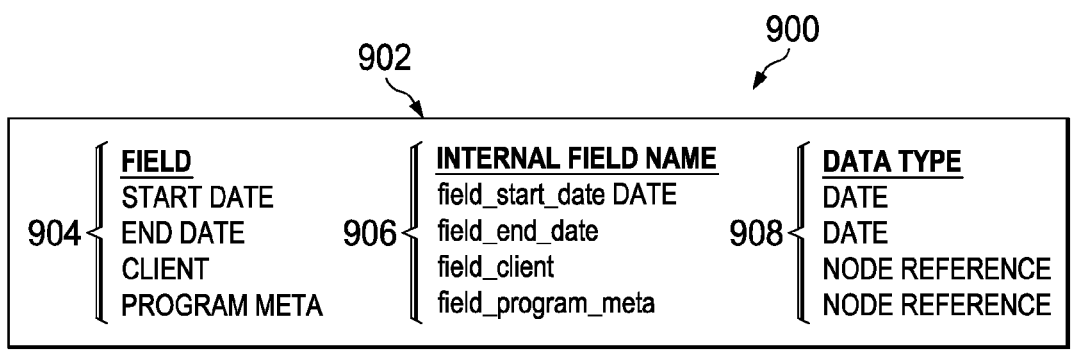
FIG. 9 is an illustration of an entity type in accordance with an illustrative embodiment.

With reference now to FIG. 9, an illustration of an entity type is depicted in accordance with an illustrative embodiment. In this illustrative example, entity type 900 is an example of an entity type in entity types 426 in FIG. 4. Entity type 900 is program 902 in this illustrative example. Program 902 is an example of one implementation for program 604 in FIG. 6.

As depicted, program 902 includes column 904, column 906, and column 908. Column 904 identifies a number of fields for the database for a program. Column 906 identifies a number of field names for the fields listed in column 904. Further, column 908 identifies a number of data types for the number of fields listed in column 904.

Figure 10:
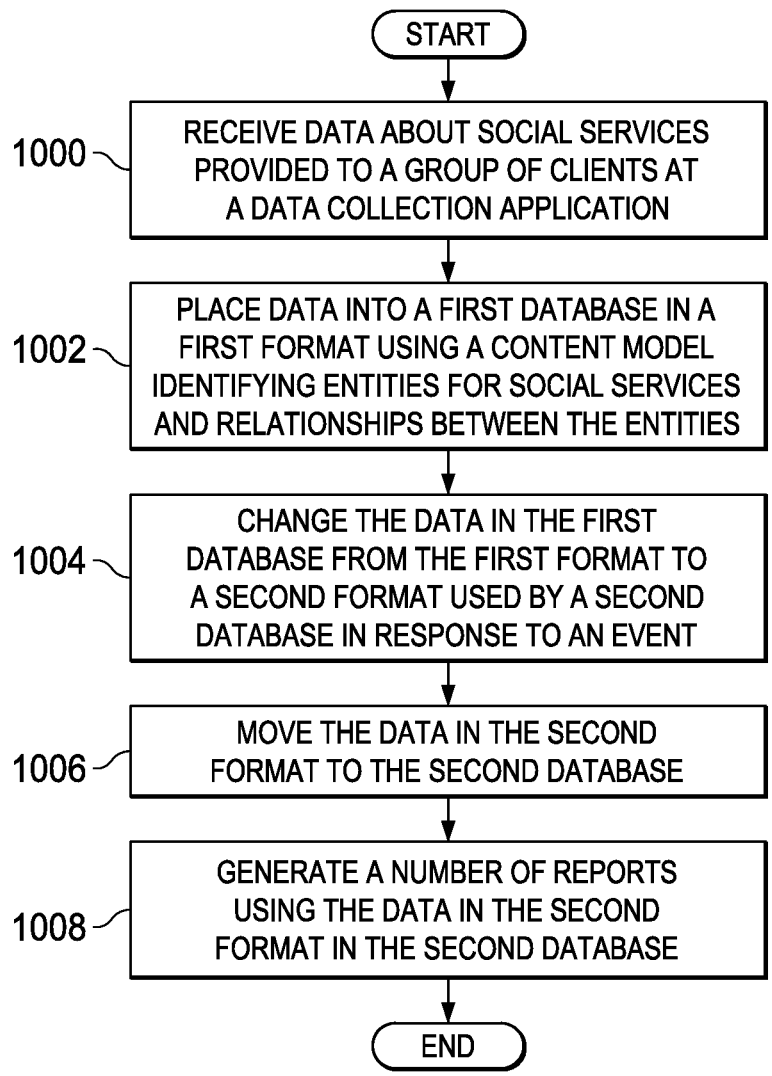
FIG. 10 is an illustration of a flowchart of a process for managing data about social services in accordance with an illustrative embodiment.

With reference now to FIG. 10, an illustration of a flowchart of a process for managing data about social services is depicted in accordance with an illustrative embodiment. The process illustrated in FIG. 10 may be implemented in social services data management system 400 in FIG. 4. In particular, this process may be implemented using social services module 408 in FIG. 4.

The process begins by receiving data about social services provided to a group of clients at a data collection application (step 1000). In step 1000, the social services may be provided to the group of clients by, for example, a settlement house. The data collection application runs on a computer system, such as computer system 402 in FIG. 4. The process places data into a first database in a first format using a content model identifying entities for social services and relationships between the entities (step 1002). The relationships between the entities are many-to-one relationships in these examples.

Thereafter, the process changes the data in the first database from the first format to a second format used by a second database in response to an event (step 1004). The event may be a periodic event and/or a non-periodic event. A periodic event may include, for example, without limitation, the lapse of a timer, a recurring schedule time for the change, and/or some other suitable periodic event. A non-periodic event may be, for example, without limitation, a request for the change received in user input, a pre-scheduled time and/or date for the change, and/or some other suitable non-periodic event. The process then moves the data in the second format to the second database (step 1006).

Next, the process generates a number of reports using the data in the second format in the second database (step 1008), with the process terminating thereafter. The number of reports may be generated using the relationships between the entities. In these illustrative examples, operation 1008 may be performed in response to a request from a user for the number of reports and/or in response to an event. For example, in some illustrative examples, the number of reports may be generated in response to a recurring event.

Figure 11:
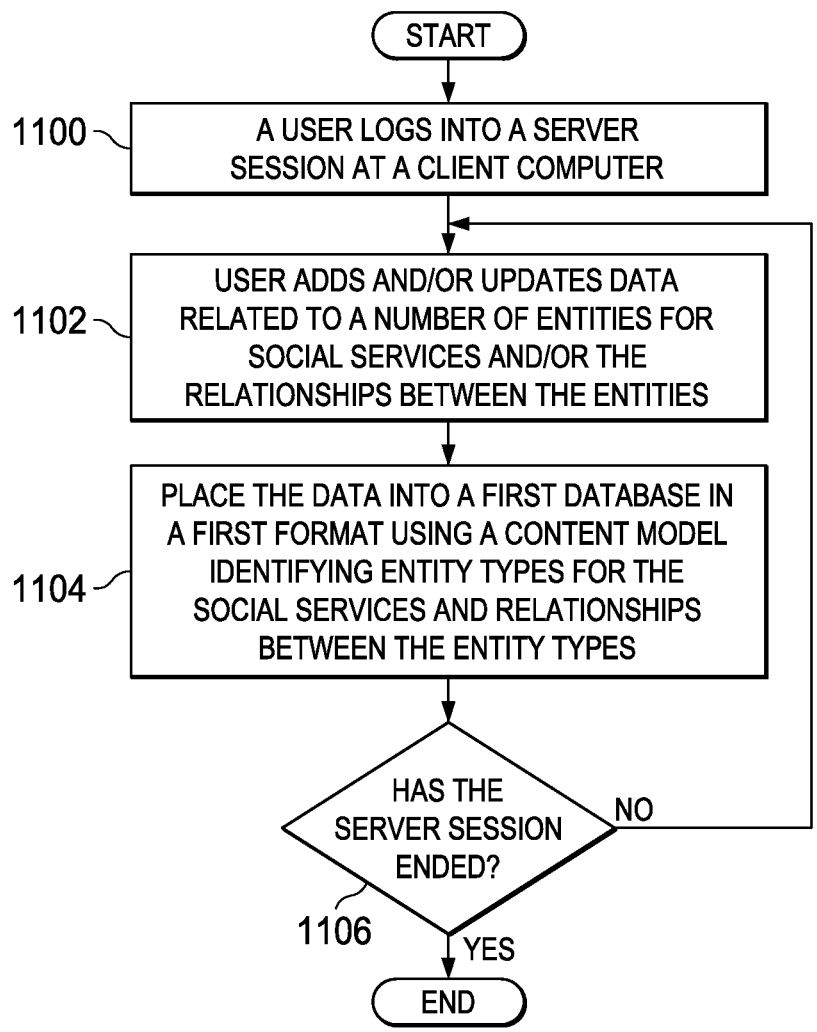
FIG. 11 is an illustration of a flowchart of a process for managing data about social services in accordance with an illustrative embodiment.

With reference now to FIG. 11, an illustration of a flowchart of a process for managing data about social services is depicted in accordance with an illustrative embodiment. The process illustrated in FIG. 11 may be implemented in social services data management system 400 in FIG. 4. In particular, this process may be implemented using social services module 408 in FIG. 4.

The process begins by a user logging into a server session at a client computer (step 1100). In this illustrative example, the client computer is part of a cloud network. The cloud network is hosted by a settlement house in this illustrative example. The user then adds and/or updates data related to a number of entities for social services and/or relationships between the number of entities (step 1102). For example, in step 1102, the user may add and/or update the data using a graphical user interface displayed at the client computer. Thereafter, the process places the data into a first database in a first format using a content model identifying entity types for the social services and relationships between the entity types (step 1104).

Then, the process determines whether the server session has ended (step 1106). If the server session has ended, the process terminates. Otherwise, the process returns to step 1102 as described above.

Figure 12:
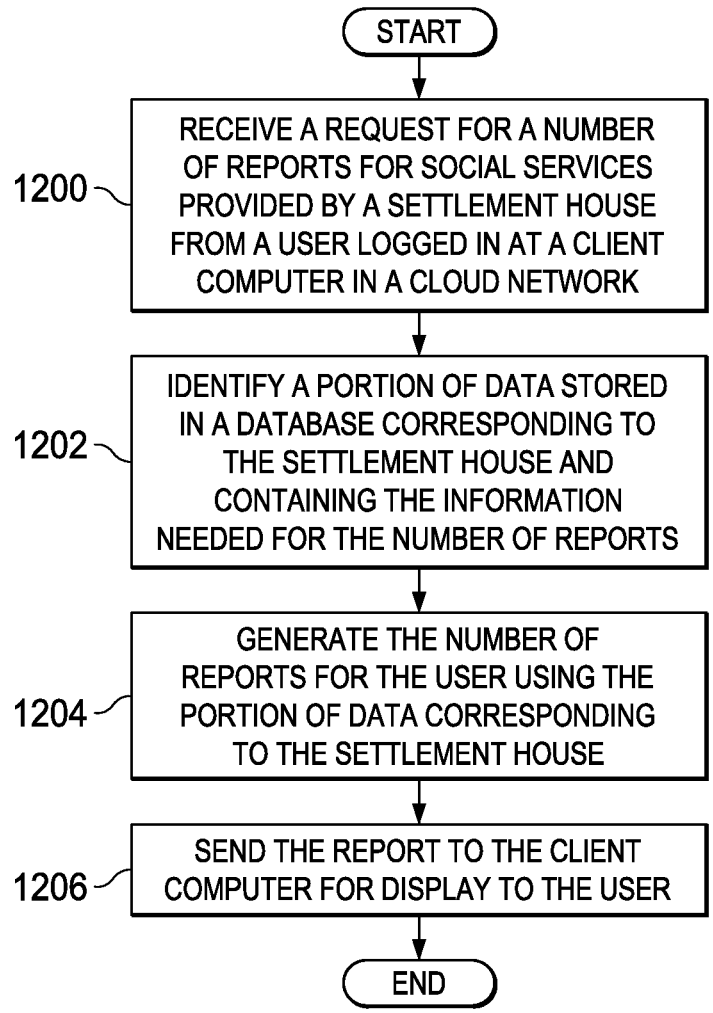
FIG. 12 is an illustration of a flowchart for generating reports for social services in accordance with an illustrative embodiment.

With reference now to FIG. 12, an illustration of a flowchart for generating reports for social services is depicted in accordance with an illustrative embodiment. The process illustrated in FIG. 12 may be implemented in social services data management system 400 in FIG. 4. In particular, this process may be implemented using social services module 408 in FIG. 4.

The process begins by receiving a request for a number of reports for social services provided by a settlement house from a user logged in at a client computer in a cloud network (step 1200). The user may have a role associated with the settlement house. For example, the user may be an administrator, a manager, a program manager, a service team leader, or some other type of user.

The process identifies a portion of data stored in a database corresponding to the settlement house and containing the information needed for the number of reports (step 1202). Thereafter, the process generates the number of reports for the user using the portion of data corresponding to the settlement house (step 1204). Next, the process sends the report to the client computer for display to the user (step 1206), with the process terminating thereafter.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output, or I/O devices (including, but not limited to, keyboards, displays, pointing devices, etc.), can be coupled to the system either directly or through intervening I/O controllers.

Network adapters may also be coupled to the system to enable the data processing system to become coupled to other data processing systems, remote printers, or storage devices through intervening private or public networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing data associated with social services, the method comprising:
   a computer receiving the data associated with social services;
   the computer dividing the data associated with the social services and classifying the divided data into a first plurality of entity types based on a first social services content model, the first plurality of entity types comprising:
     client entity type identifying clients to whom social services are provided;
     service entity type identifying service to be provided to the clients;
     census entity type identifying census statistics corresponding to a social service organization, a social service program, and/or the service to be provided to said clients;
     volunteer entity type identifying one or more volunteers in the social service organization; and
     review entity type identifying how close an organization is to reaching a number of goals based on cost per client, a year, a number of funding resources, a net income, income growth, and program performance ratings, and evaluation of the financial status of the organization based on cost per client, a year, a number of funding resources, a net income, income growth, and program performance ratings;

responsive to identifying one or more correlations based on at least two of client entity type, service entity type, census entity type, volunteer entity type, and review entity type, the computer creating a first set of one or more relationships between entity types corresponding to the identified one or more correlations;

the computer storing the first plurality of entity types and the first set of one or more relationships between entities in a first database; and the computer generating a first set of reports using the stored first plurality of entity types and the first set of one or more relationships in the first database.

2. The method according to claim 1, further comprising:

the computer identifying a first portion of data in the first plurality of entity types and the first set of one or more relationships between entities in the first database;

the computer classifying the first portion of data into a second plurality of entity types based on a second social services content model, the second plurality of entity types comprising:
   the client entity type identifying clients to whom social services are provided;
   program entity type identifying one or more social services programs where the clients are enrolled;
   division entity type identifying a department in the organization that runs the one or more social services programs;
   program meta entity type identifying metadata for the one or more social services programs; and
   program group entity type identifying one or more program group for the clients;

responsive to identifying one or more correlations based on at least two of the client entity type, the program entity type, the division entity type, the program meta entity type, and the program group entity type, the computer creating a second set of one or more relationships between entities corresponding to the identified one or more correlations;

the computer storing the second plurality of entity types and the second set of one or more relationships between entity types in a second database; and the computer generating a second set of reports using the stored second plurality of entity types and the second set of one or more relationships in the second database.

3. The method according to claim 2, further comprising:

the computer identifying a second portion of data in the second plurality of entity types and the second set of one or more relationships between entities in the second database;

the computer classifying the second portion of data into a third plurality of entity types based on a third social services content model, the third plurality of entity types comprising:
   the service entity type identifying service to be provided to the clients;
   service group entity type identifying set of services provided to an identified set of clients;
   program group meta entity type identifying metadata for one or more social services programs through which the different services in a service group are run;
   service totals month entity type identifying monthly statistical information corresponding to a set of services; and
   service group month entity type identifying monthly statistical information corresponding to the service group;

responsive to identifying one or more correlations based on at least two of the service entity type, the service group entity type, the program group meta entity type, the service totals month entity type, and the service group month entity type, the computer creating a third set of one or more relationships between entity types corresponding to the identified one or more correlations;

the computer storing the third plurality of entity types and the third set of one or more relationships between entities in a third database; and the computer generating a third set of reports using the stored third plurality of entity types and the third set of one or more relationships in the third database.

4. The method according to claim 2, wherein the step of identifying a first portion of data in the first plurality of entity types and the first set of one or more relationships between entities in the first database is initiated by a lapse of a timer.

5. The method according to claim 3, wherein the step of identifying a second portion of data in the second plurality of entity types and the second set of one or more relationships between entities in the second database is initiated by receiving a request from a user.

6. The method according to claim 3, further comprising:
   the computer initiating a trend analysis based on the first set of reports, the second set of reports, and the third set of reports.

7. The method according to claim 3, further comprising:
   the computer creating one or more nodes within the first plurality of entity types, the second plurality of entity types, and the third plurality of entity types, wherein each of the one or more nodes represent a portion of the divided data associated with social services; and
   in response to identifying one or more correlations based on at least two of the nodes, the computer creating a fourth set of one or more relationships between entity types corresponding to the identified one or more correlations.

8. A computer program product for managing data associated with social services, the computer program product comprising:
   one or more computer readable hardware storage device and program instructions stored on the one or more computer readable storage device, the program instructions comprising:
   program instructions to receive the data associated with social services;
   program instructions to divide the data associated with the social services and classify the divided data into a first plurality of entity types based on a first social services content model, the first plurality of entity types comprising:
   client entity type identifying clients to whom social services are provided;
   service entity type identifying service to be provided to the clients;
   census entity type identifying census statistics corresponding to a social service organization, a social service program, and/or the service to be provided to said clients;
   volunteer entity type identifying one or more volunteers in the social service organization; and
   review entity type identifying how close an organization is to reaching a number of goals based on cost per client, a year, a number of funding resources, a net income, income growth, and program performance ratings, and evaluation of the financial status of the organization based on cost per client, a year, a number of funding resources, a net income, income growth, and program performance ratings;

program instructions to create a first set of one or more relationships between entity types in response to identifying one or more correlations based on at least two of client entity type, service entity type, census entity type, volunteer entity type, and review entity type;

program instructions to store the first plurality of entity types and the first set of one or more relationships between entities in a first database; and program instructions to generate a first set of reports using the stored first plurality of entity types and the first set of one or more relationships in the first database.

9. The computer program product according to claim 8, further comprising:

program instructions to identify a first portion of data in the first plurality of entity types and the first set of one or more relationships between entities in the first database;

program instructions to classify the first portion of data into a second plurality of entity types based on a second social services content model, the second plurality of entity types comprising:
  the client entity type identifying clients to whom social services are provided;
  program entity type identifying one or more social services programs where the clients are enrolled;
  division entity type identifying a department in the organization that runs the one or more social services programs;
  program meta entity type identifying metadata for the one or more social services programs; and
  program group entity type identifying one or more program group for the clients;

program instructions to create a second set of one or more relationships between entities in response to identifying one or more correlations based on at least two of the client entity type, the program entity type, the division entity type, the program meta entity type, and the program group entity type;

program instructions to store the second plurality of entity types and the second set of one or more relationships between entity types in a second database; and program instructions to generate a second set of reports using the stored second plurality of entity types and the second set of one or more relationships in the second database.

10. The computer program product according to claim 9, further comprising:

programs instructions to identify a second portion of data in the second plurality of entity types and the second set of one or more relationships between entities in the second database;

program instructions to classify the second portion of data into a third plurality of entity types based on a third social services content model, the third plurality of entity types comprising:
  the service entity type identifying service to be provided to the clients;
  service group entity type identifying set of services provided to an identified set of clients;
  program group meta entity type identifying metadata for one or more social services programs through which different services in a service group are run;
  service totals month entity type identifying monthly statistical information corresponding to a set of services; and
  service group month entity type identifying monthly statistical information corresponding to the service group;

program instructions to create a third set of one or more relationships between entity types in response to identifying one or more correlations based on at least two of the service entity type, the service group entity type, the program group meta entity type, the service totals month entity type, and the service group month entity type;

program instructions to store the third plurality of entity types and the third set of one or more relationships between entities in a third database; and program instructions to generate a third set of reports using the stored third plurality of entity types and the third set of one or more relationships in the third database.

11. The computer program product according to claim 9, wherein the program instructions to identify a first portion of data in the first plurality of entity types and the first set of one or more relationships between entities in the first database is initiated by a lapse of a timer.

12. The computer program product according to claim 10, wherein the program instructions to identify a second portion of data in the second plurality of entity types and the second set of one or more relationships between entities in the second database is initiated by receiving a request from a user.

13. The computer program product according to claim 10, further comprising:

program instructions to initiate a trend analysis based on the first set of reports, the second set of reports, and the third set of reports.

14. The computer program product according to claim 10, further comprising:

program instructions to create one or more nodes within the first plurality of entity types, the second plurality of entity types, and the third plurality of entity types, wherein each of the one or more nodes represent a portion of the divided data associated with social services; and program instructions to create a fourth set of one or more relationships between entity types in response to identifying one or more correlations based on at least two of the nodes.

15. A computer system for managing data associated with social services, the system comprising:
  a bus;
  one or more computer processors;
  one or more computer readable hardware storage devices;
  program instructions stored on the computer readable hardware storage device for execution by at least one of the one or more processors, the program instructions comprising:
  program instructions to receive the data associated with social services;
  program instructions to divide the data associated with the social services and classify the divided data into a first plurality of entity types based on a first social services content model, the first plurality of entity types comprising:
    client entity type identifying clients to whom social services are provided;
    service entity type identifying service to be provided to the clients;

census entity type identifying census statistics corresponding to a social service organization, a social service program, and/or the service to be provided to said clients;

volunteer entity type identifying one or more volunteers in the social service organization; and review entity type identifying how close an organization is to reaching a number of goals based on cost per client, a year, a number of funding resources, a net income, income growth, and program performance ratings, and evaluation of the financial status of the organization based on cost per client, a year, a number of funding resources, a net income, income growth, and program performance ratings;

program instructions to create a first set of one or more relationships between entity types in response to identifying one or more correlations based on at least two of client entity type, service entity type, census entity type, volunteer entity type, and review entity type;

program instructions to store the first plurality of entity types and the first set of one or more relationships between entities in a first database; and program instructions to generate a first set of reports using the stored first plurality of entity types and the first set of one or more relationships in the first database.

16. The method according to claim 15, further comprising:
program instructions to identify a first portion of data in the first plurality of entity types and the first set of one or more relationships between entities in the first database;

program instructions to classify the first portion of data into a second plurality of entity types based on a second social services content model, the second plurality of entity types comprising:

the client entity type identifying clients to whom social services are provided;

program entity type identifying one or more social services programs where the clients are enrolled;

division entity type identifying a department in the organization that runs the one or more social services programs;

program meta entity type identifying metadata for the one or more social services programs; and program group entity type identifying one or more program group for the clients;

program instructions to create a second set of one or more relationships between entities in response to identifying one or more correlations based on at least two of the client entity type, the program entity type, the division entity type, the program meta entity type, and the program group entity type;

program instructions to store the second plurality of entity types and the second set of one or more relationships between entity types in a second database; and program instructions to generate a second set of reports using the stored second plurality of entity types and the second set of one or more relationships in the second database.

17. The method according to claim 16, further comprising:
programs instructions to identify a second portion of data in the second plurality of entity types and the second set of one or more relationships between entities in the second database;

program instructions to classify the second portion of data into a third plurality of entity types based on a third social services content model, the third plurality of entity types comprising:

the service entity type identifying service to be provided to the clients;

service group entity type identifying set of services provided to an identified set of clients;

program group meta entity type identifying metadata for one or more social services programs through which different services in a service group are run;

service totals month entity type identifying monthly statistical information corresponding to a set of services; and service group month entity type identifying monthly statistical information corresponding to the service group;

program instructions to create a third set of one or more relationships between entity types in response to identifying one or more correlations based on at least two of the service entity type, the service group entity type, the program group meta entity type, the service totals month entity type, and the service group month entity type;

program instructions to store the third plurality of entity types and the third set of one or more relationships between entities in a third database; and program instructions to generate a third set of reports using the stored third plurality of entity types and the third set of one or more relationships in the third database.

18. The computer system according to claim 16, wherein the program instructions to identify a first portion of data in the first plurality of entity types and the first set of one or more relationships between entities in the first database is initiated by a lapse of a timer.

19. The computer system according to claim 17, further comprising:
program instructions to initiate a trend analysis based on the first set of reports, the second set of reports, and the third set of reports.

20. The computer system according to claim 17, further comprising:
program instructions to create one or more nodes within the first plurality of entity types, the second plurality of entity types, and the third plurality of entity types, wherein each of the one or more nodes represent a portion of the divided data associated with social services; and program instructions to create a fourth set of one or more relationships between entity types in response to identifying one or more correlations based on at least two of the nodes.

* * * * *